Sept. 8, 1931. J. M. McCLATCHIE 1,821,943
MANUFACTURE OF EVAPORATED MILK
Filed July 6, 1927
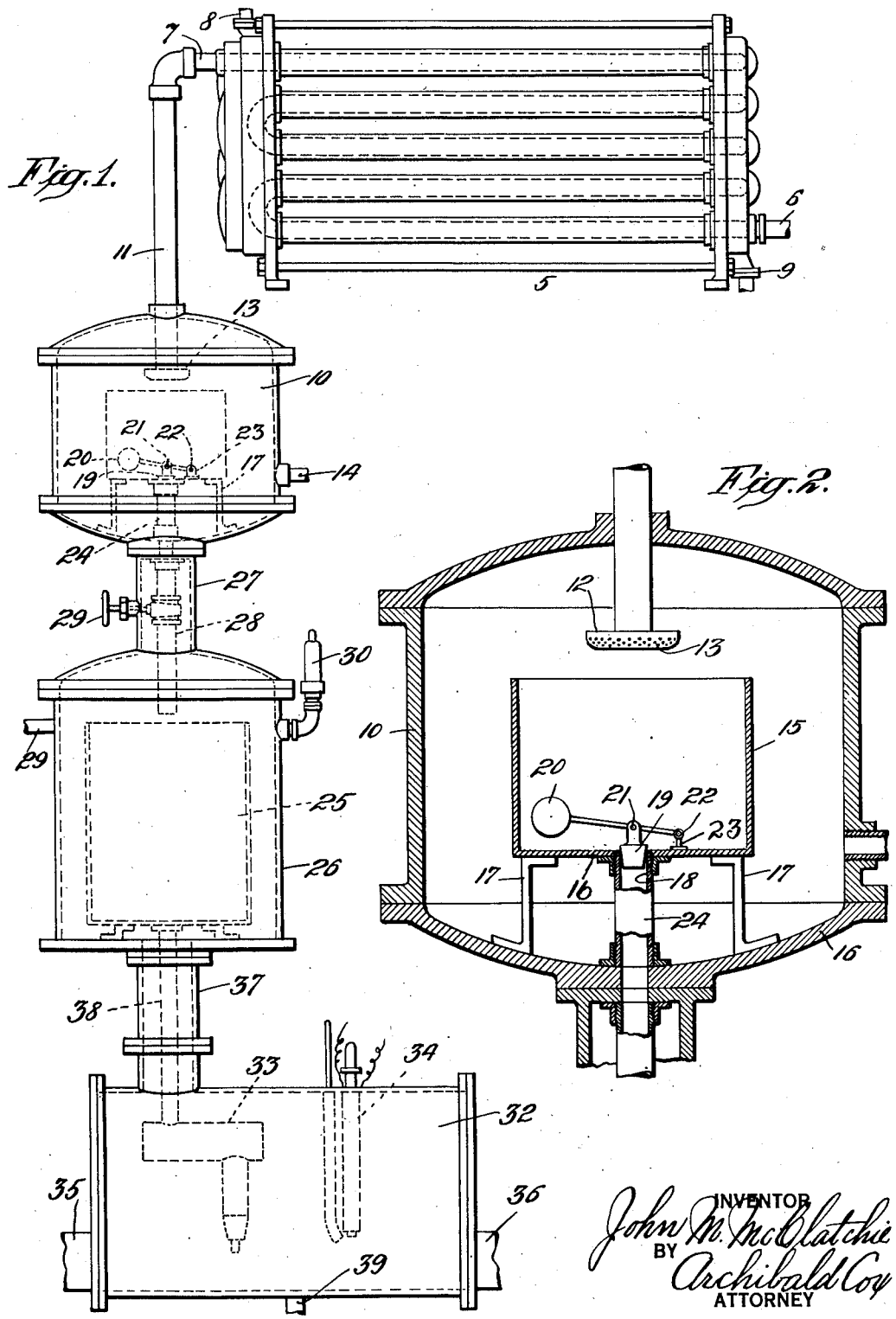

Patented Sept. 8, 1931

1,821,943

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

MANUFACTURE OF EVAPORATED MILK

Application filed July 6, 1927. Serial No. 203,762.

The invention relates to an improvement in the manufacture of evaporated milk.

In the method of manufacturing evaporated milk disclosed and claimed in my copending application Serial No. 116,141, filed June 15, 1926, the evaporated milk is sterilized before canning and is then introduced into and sealed in the cans under sterilizing conditions. The present invention constitutes an improvement in the method of sterilizing or preparing the evaporated milk for canning set forth in said application. By sterilizing the evaporated milk before canning, rather than after canning, which is the common commercial practice at the present time, I avoid imparting to the milk the strong cooked flavor incident to sterilizing the milk through the walls of the tin cans in which the milk is preserved. In the method set forth in said application the evaporated milk is raised to the sterilizing temperature and then the milk is enclosed in the cans at substantially that temperature. If the milk is sealed in the cans within the requisite period after raising the temperature of the milk to the sterilizing point, the strong cooked flavor to which many people object will not be imparted to the milk. If, however, conditions of operation require the sterilized milk to be held at the high sterilizing temperature for any considerable period of time before canning, the milk will have a tendency to cook and acquire a stronger cooked flavor than it would have if canned immediately after reaching the sterilizing temperature.

The object of the present invention is to produce a method of treating or preparing the evaporated milk for canning by which, after the milk has been sterilized, it may be held for any desired period of time without liability of imparting a stronger cooked flavor to the milk than the milk acquired during its previous treatment. To this end the invention contemplates raising the temperature of the evaporated milk to a predetermined degree—at which temperature there is no liability of imparting a stronger cooked flavor to the milk than is imparted to fresh milk by the pasteurizing process—then suddenly raising the temperature of the milk to the point of sterilization, and then immediately cooling the milk to reduce it to the first temperature. At the reduced temperature the sterilized evaporated milk may be held as long as necessary before canning it without liability of overcooking. Experience has shown that evaporated milk may be held at a temperature of about 220° F. for a considerable period of time—long enough to introduce the milk into cans and seal it therein in the ordinary course of operations—without deleterious effects upon the milk. A convenient temperature for the sterilization of the milk may range from about 260° F. to about 280° F., depending on conditions. The method by which the temperature of the evaporated milk is raised and lowered according to the principles of the present invention in preparing the evaporated milk for canning is more fully described hereinafter and is particularly pointed out in the appended claims.

In the accompanying drawings a convenient form of apparatus in which the improved method of preparing evaporated milk for canning may be practiced is illustrated diagrammatically. Fig. 1 is a side elevation of the apparatus in which the milk is preheated, sterilized, and cooled to the preheating temperature; and of the canning devices. Fig. 2 is an enlarged longitudinal section through the sterilizing chamber.

In practicing the method of the present invention in the apparatus shown in the drawings, the evaporated or condensed milk discharged from the homogenizing or viscolizing apparatus is passed through a coil heater indicated generally by the reference numeral 5. The milk is fed into the heating coil 5 through an inlet 6 located at the lower right hand end of the coil, and is discharged through the outlet 7 located in the upper left hand end of the coil. The heating medium, such as steam at relatively low pressure, is fed into the steam jackets surrounding the milk tubes of the coil through an inlet 8 located at the upper left hand corner of the coil, and the condensate is discharged through an outlet 9 located in the lower right hand corner of the coil. Thus the milk and the heating medium flow counter-current to each other through the coil and the milk is gradually raised to the desired temperature, which may be conveniently regarded as about 220° F., because at this temperature the milk can be safely held for a considerable period, that is, long enough to pass through the tank and the tubes connected with the devices for introducing the milk into the tin cans and sealing it therein.

Raising the temperature of the milk suddenly from the degree at which it passes through the coil 5 to the degree effecting complete sterilization is accomplished by spraying the milk discharged through the outlet 7 into the chamber 10 in which is maintained an atmosphere of live steam which may have a temperature from about 260° F. to about 280° F. The chamber 10 is a closed receptacle and the outlet 7 is connected with the top of the chamber 10 by means of a pipe 11. The end of the pipe 11 which protrudes into the top of the chamber 10 is formed as a nozzle 12 provided with a large number of minute perforations 13 which divide the milk into a fine spray to expose a maximum of surface of the milk to contact with the live steam. The steam is admitted into the chamber 10 through the pipe 14 and thus there is maintained in the chamber 10 a constant atmosphere at the requisite sterilizing temperature, and consequently when the evaporated milk enters the chamber 10 in the form of a fine spray it is substantially instantaneously raised to the temperature of the steam. At this temperature, 260° F. or over, the complete destruction of the micro-organisms in the milk is effected in a relatively short time.

Since the high sterilizing temperature maintained in the chamber 10 will begin to act upon the butter fats of the milk and impart a cooked flavor to the milk in about five minutes or less, it is necessary immediately after the milk has been raised to the sterilizing temperature to reduce it to a temperature at which it can be held for the canning operation. For this reason the milk discharged as a spray through the nozzle 12 is received in a pan 15 located in the chamber 10 and supported from the bottom 16 of the chamber by the brackets 17. The fine spray falling into the pan 15 gathers in the bottom of the pan in its liquid or bulk form and is drawn from the pan 15 through an outlet 18 controlled by a plug valve 19 arranged to be operated by a float 20 pivotally connected with the plug 19 by the link 21 and fulcrumed at the point 22 on a support 23 rising from the bottom of the pan. When the reliquefied milk reaches a predetermined level in the pan 14 the float 20 is raised, thereby lifting the plug valve 19 and permitting the sterilized milk to pass down through the pipe 24 into a holding tank 25 located in the chamber 26 which is a closed receptacle like the chamber 10. The pipe 24 passes through the bottom 16 of the chamber 10 and through an insulating jacket 27 connecting the bottom of the chamber 10 with the top of the chamber 26. A control valve 29 is located in the section 28 of the pipe 24 enclosed by the jacket 27.

Raising the temperature of the evaporated milk by contacting it with live steam in the chamber 10 causes the milk to absorb, that is, condense and take up a certain quantity of steam. To cause the milk to give up an amount of moisture equal to the amount of moisture taken up in the chamber 10, I maintain in the chamber 26 a temperature and pressure substantially equal to the temperature and pressure at which the milk enters the chamber 10 from the preheating coil 5. This is done by admitting steam into the chamber 26 through the pipe 29 and providing chamber 26 with a safety valve 30 by which the pressure in the chamber 26 is properly regulated to maintain the temperature at the desired point. At the pressure maintained in the chamber 26 an amount of moisture equal to that taken up by the milk in the chamber 10 is immediately flashed into vapor. By this method of treatment there is no dilution of the milk by subjecting it to live steam to effect destruction of the micro-organisms in the milk, and consequently the milk passes into the filling devices at the same degree of density at which it passes through the preliminary heating coil 5.

From the tank 25 the milk is fed into a chamber 32 in which are located the devices 33 for introducing the milk into the cans, and the devices 34 for sealing the cans. The chamber 26 is connected with the chamber 32 by the pipe 37 in which is located the conduit 38 leading from the bottom of the tank 25 to the can filling devices 33. Thus the interior of the chamber 32 is maintained at substantially the same temperature and pressure as the interior of the chamber 26. Any condensate which gathers in the chamber 32 is carried away through the pipe 39. The empty cans may be fed into the chamber 32 through the inlet 35 and the filled, sealed cans may be discharged from the chamber 32 through the outlet 36.

Having thus described the invention what I claim as new is:—

1. The method of preparing evaporated milk for canning which consists in introducing the milk at a predetermined temperature in a finely divided condition into a closed chamber, maintaining in the chamber an atmosphere of steam at a predetermined temperature and pressure to sterilize the milk, feeding the sterilized milk into a second chamber, maintaining in the second chamber an atmosphere of steam at a predetermined pressure to reduce the milk to its first temperature, and then canning the milk at the reduced temperature without exposing it to the air.

2. The method of preparing evaporated milk for canning which consists in raising the milk to a predetermined temperature, introducing the milk into a chamber, maintaining in the chamber an atmosphere of steam at a predetermined temperature and pressure to sterilize the milk, introducing the sterilized milk into a second chamber, maintaining in the second chamber an atmosphere of steam at a predetermined pressure to reduce the milk to the first temperature, and then canning the milk.

3. The method of preparing evaporated milk for canning which consists in raising the milk to a predetermined temperature, suddenly raising the milk to a sterilizing temperature by contacting it with live steam, reducing the sterilized milk to its first temperature by subjecting the sterilized milk to steam at a pressure sufficient to cause the milk to give up the moisture taken up in the sterilizing step, and canning the milk.

4. In the method of preparing evaporated milk for canning, raising the milk to a sterilizing temperature by contacting it with live steam, and reducing the temperature of the milk for canning by subjecting it to a predetermined pressure to cause the milk to give up the moisture it absorbed during the sterilizing step.

5. The method of preparing evaporated milk for canning which consists in spraying the milk into an atmosphere of live steam to sterilize the milk, reliquefying the milk and introducing it into an atmosphere of steam maintained at a pressure at which the milk gives up the moisture it absorbed during the sterilizing step.

6. The method of sterilizing evaporated milk which consists in raising the temperature of the milk to a predetermined point, finely dividing the milk and at the same time raising its temperature to a predetermined degree to sterilize the milk, and then reducing the milk to the first temperature.

7. In the treatment of evaporated milk the steps of suddenly raising the temperature of the evaporated milk to a predetermined degree by finely dividing the milk and contacting it with live steam, gathering the finely divided milk into bulk form again, reducing the temperature of the milk and then canning the milk.

JOHN M. McCLATCHIE.